United States Patent [19]

Wilhelm et al.

[11] Patent Number: 4,537,711
[45] Date of Patent: Aug. 27, 1985

[54] FUEL ASSEMBLY SKELETON COMPACTION

[75] Inventors: John J. Wilhelm, New Kensington; Anoop Kapoor, Monroeville; Richard M. Kobuck, Delmont; Ronald F. Antol, North Huntingdon; George W. Norris, Wilkins Township, Allegheny County, all of Pa.

[73] Assignee: Westinghouse Electric Corp., Pittsburgh, Pa.

[21] Appl. No.: 455,684

[22] Filed: Jan. 5, 1983

[51] Int. Cl.³ .................. G21F 9/22; G21F 9/34; B30B 15/06
[52] U.S. Cl. .................. 252/633; 83/15; 100/229 R; 100/229 A; 252/626
[58] Field of Search .................. 252/626, 633; 100/229 A, 229 R, 104; 83/15; 110/223

[56] References Cited

U.S. PATENT DOCUMENTS

| | | | |
|---|---|---|---|
| 2,978,999 | 4/1961 | Smith | 110/18 |
| 3,082,893 | 3/1963 | Hollings et al. | 214/658 |
| 3,600,277 | 8/1971 | Germer | 376/261 |
| 3,722,338 | 3/1973 | Cherel | 83/278 |
| 3,815,323 | 6/1974 | Longo | 100/229 A |
| 4,008,658 | 2/1977 | Stock et al. | 100/229 R |
| 4,095,495 | 6/1978 | Chaze et al. | 83/15 |
| 4,290,906 | 9/1981 | Saito et al. | 83/54 |

FOREIGN PATENT DOCUMENTS

| | | | |
|---|---|---|---|
| 2659691 | 11/1978 | Fed. Rep. of Germany | 252/626 |
| 1215265 | 12/1970 | United Kingdom | 252/626 |
| 1528478 | 10/1978 | United Kingdom | 252/626 |

OTHER PUBLICATIONS

Stoller, et al., ed. 1961, Reactor Handbook, vol. II, Fuel Reprocessing, Interscience Publishers Inc., New York, pp. 26–32.

Primary Examiner—Ben R. Padgett
Assistant Examiner—Howard J. Locker
Attorney, Agent, or Firm—L. A. DePaul

[57] ABSTRACT

The fuel assembly skeleton compaction system provides a means for remotely dismantling an irradiated nuclear fuel assembly skeleton once the nuclear fuel rods have been removed therefrom while the skeleton remains submerged in a coolant. The system comprises a feed chamber for holding the spent fuel assembly skeleton and for feeding a spent fuel assembly skeleton into a shear chamber which is arranged near the feed chamber. The shear chamber contains a shearing device for shearing the skeleton into small pieces and for moving the pieces of the skeleton into a compaction chamber which is located adjacent to the shear chamber. The compaction chamber contains a compaction cylinder for compacting the pieces of the skeleton introduced thereinto. A storage canister is located below the compaction chamber such that when the slide of the compaction chamber is opened, the compacted pieces of the skeleton may be pushed into the storage canister. When the storage canister is filled, it may be remotely removed and replaced with an empty canister.

7 Claims, 10 Drawing Figures

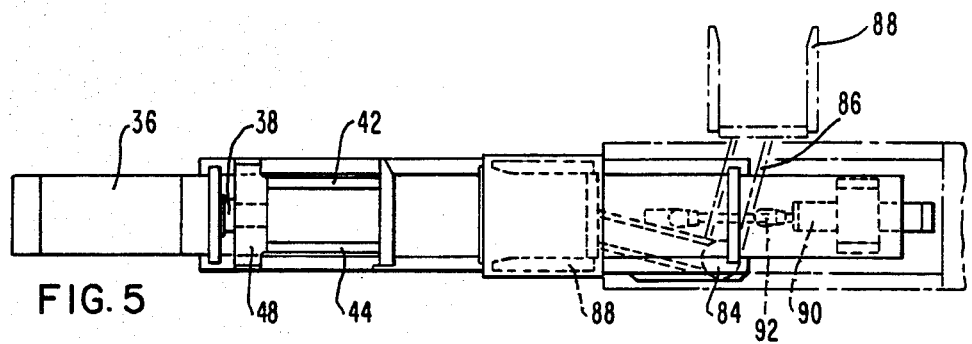
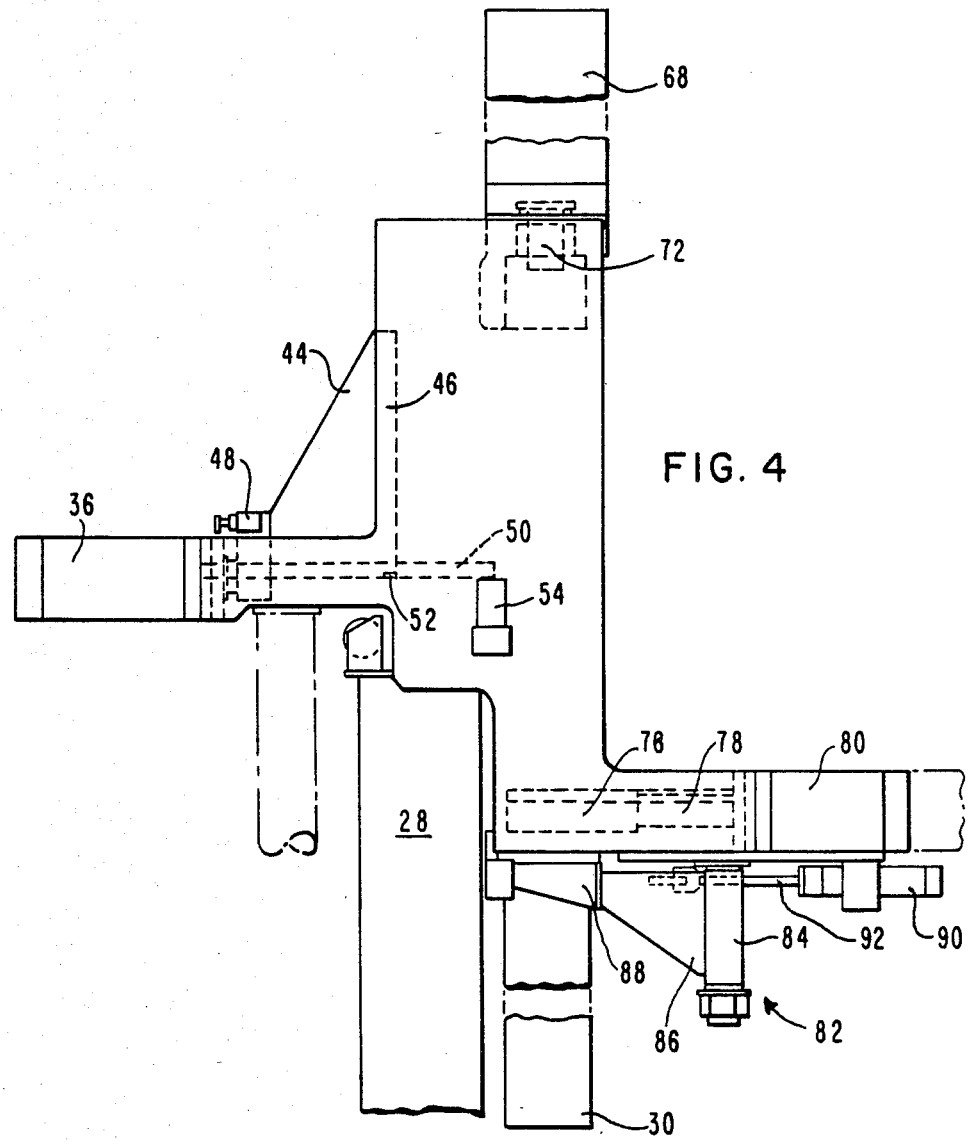

FUEL ASSEMBLY SKELETON COMPACTION

BACKGROUND OF THE INVENTION

This invention relates to storage of nuclear fuel assemblies and more particularly, to the consolidation of the spent nuclear fuel rods and compaction of a nuclear fuel assembly skeleton.

After a period of operation of a nuclear reactor, the fuel assemblies comprising the core of the nuclear reactor must be rearranged with the depleted or spent fuel assemblies being replaced with fresh ones. The spent fuel assemblies are removed from the reactor vessel and generally stored in a pool of water on the reactor site. Since a conventional fuel assembly comprises structure other than fuel rods such as grids and control rod guide tubes, the spent fuel assembly occupies more space in the storage pool than would be required for the individual fuel rods. Because the storage pool has a finite volume, it would be desirable to be able to store the fuel rods in a closely-packed array and with a minimum of support structure to thereby maximize the amount of spent nuclear fuel rods that can be stored in a given volume of the storage pool. This would provide greater storage capacity for the spent fuel rods until the fuel rods are transported off the reactor site for storage or reprocessing.

However, since the spent fuel rods have been irradiated during reactor operation, they are highly radioactive and can be handled only by remote manipulators and while the fuel rods are submerged in a coolant. The radioactive nature of the spent fuel assemblies increases the difficulty of not only transporting the spent fuel assembly but also dismantling the fuel assembly and storing the spent fuel rods.

In copending Patent Application Ser. No. 268,225, filed May 29, 1981, in the name of P. Pomaibo et al., and entitled "Spent Fuel Consolidation System", there is described a system for vertically and remotely dismantling an irradiated nuclear fuel assembly while the fuel assembly remains submerged in a coolant and for consolidating the spent fuel rods of the dismantled fuel assembly. According to Pomaibo et al., the spent nuclear fuel rods are removed from the spent fuel assembly without damaging the fuel rods and the fuel rods are then rearranged into a consolidated configuration. Once the spent fuel rods have been removed from the fuel assembly, the remainder of the fuel assembly which is generally referred to as the spent fuel assembly skeleton may be disposed of separately from the nuclear fuel rods. While Pomaibo et al. describe a system for consolidating the nuclear fuel rods, they do not address the subject of consolidation or compaction of the spent nuclear fuel assembly skeleton.

Therefore, what is needed is a system for compacting the spent nuclear fuel assembly skeleton once the nuclear fuel rods have been removed therefrom.

SUMMARY OF THE INVENTION

The fuel assembly skeleton compaction system provides a means for remotely dismantling an irradiated nuclear fuel assembly skeleton once the nuclear fuel rods have been removed therefrom while the skeleton remains submerged in a coolant. The system comprises a feed chamber for holding the spent fuel assembly skeleton and for feeding a spent fuel assembly skeleton into a shear chamber which is arranged near the feed chamber. The shear chamber contains a shearing device for shearing the skeleton into small pieces and for moving the pieces of the skeleton into a compaction chamber which is located adjacent to the shear chamber. The compaction chamber contains a compaction cylinder for compacting the pieces of the skeleton introduced thereinto. A storage canister is located below the compaction chamber such that when the slide of the compaction chamber is opened, the compacted pieces of the skeleton may be pushed into the storage canister. When the storage canister is filled, it may be remotely removed and replaced with an empty canister.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

FIG. 4 is a view in elevation of the shear and compaction chambers;

FIG. 5 is a top view of FIG. 4;

DESCRIPTION OF THE PREFERRED EMBODIMENTS

When it is desired to consolidate spent fuel rods of a nuclear fuel assembly, it is first necessary to disassemble the fuel assembly and then rearrange the fuel rods into a compact configuration. It is also desirable to be able to compact the spent fuel assembly skeleton for storage in a reduced volume. The invention described herein provides a system for compacting the spent fuel assembly skeleton of a nuclear fuel assembly.

Figure 2:
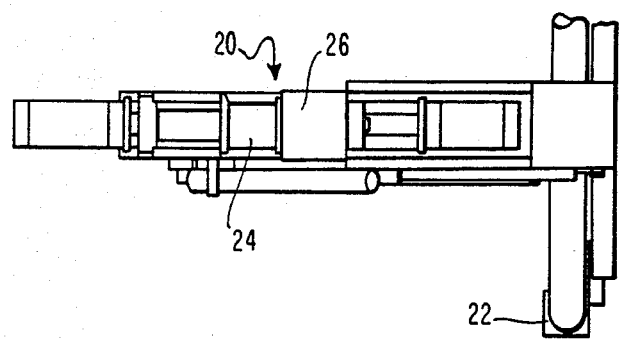
FIG. 2 is a top view of FIG. 1.
Figure 1:
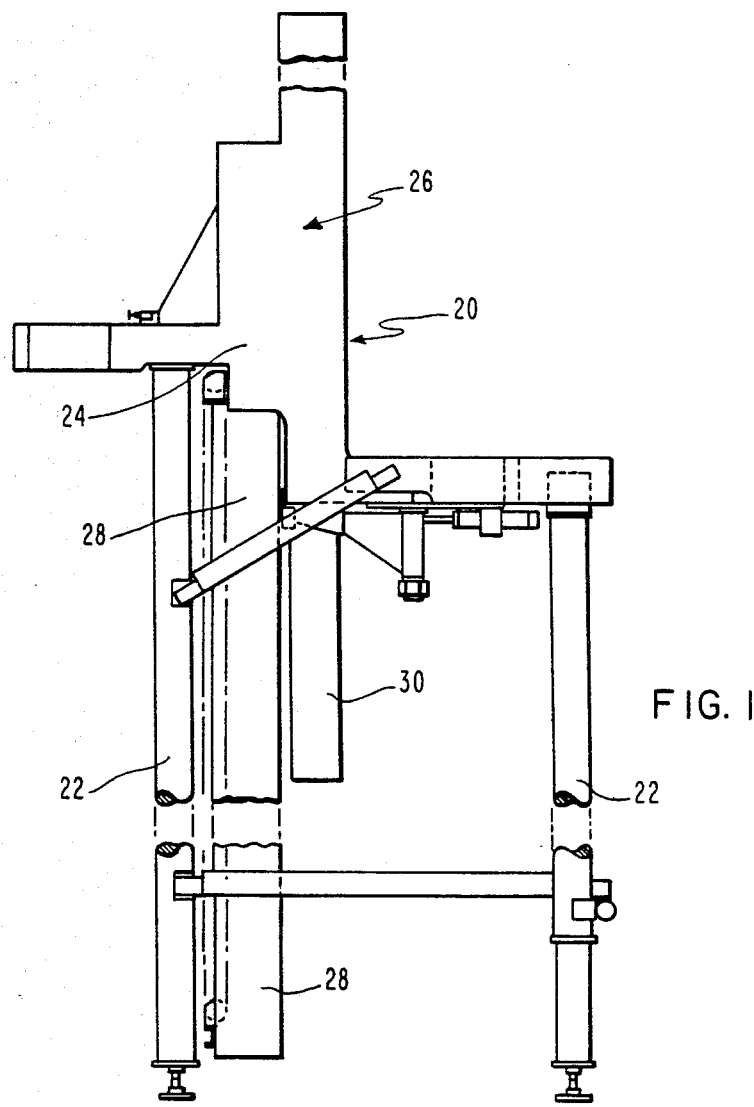
FIG. 1 is a view in elevation of the compaction apparatus.

Referring to FIGS. 1 and 2, the fuel assembly skeleton compaction system comprises a compaction housing 20 which is supported by vertical supports 22 and capable of being submerged in a coolant such as water. Compaction housing 20 comprises a shear chamber 24 and a compaction chamber 26. Shear chamber 24 provides a means by which a spent fuel assembly skeleton may be introduced thereinto and sheared into a plurality of small pieces which pieces may then be moved to compaction chamber 26 for compacting into a compact arrangement for storage. A feed chamber 28 is disposed under shear chamber 24 and connected thereto for holding a spent fuel assembly skeleton and for introducing the skeleton into shear chamber 24. In addition, a canister 30 is disposed under and attached to compaction chamber 26 for collecting the compacted pieces of the fuel assembly skeleton.

Referring to FIGS. 3-7, a shear mechanism 32 may be disposed on vertical supports 22 and attached to shear chamber 24 for shearing fuel assembly skeleton 34 into small pieces. Shear mechanism 32 may comprise an hydraulic first cylinder 36 which may have approximately a 7 inch bore and a 12 inch stroke and may be capable of exerting approximately 20 tons force. First cylinder 36 has a first piston 38 which may be substantially horizontally disposed relative to shear chamber 24 and attached at one end to shearing device 40. Shearing device 40 may comprise a first side plate 42, a second side plate 44, and a front plate 46. First side plate 42 and second side plate 44 are each connected to mounting mechanism 48 which is attached to first piston 38 for moving shearing device 40 in a reciprocal motion with first piston 38. Each side wall of shear chamber 24 has a slot 50 therein in which an extension of first side plate 42 and an extension of second side plate 44 may be disposed for guiding shearing device 40 as shearing device 40 is moved relative to shear chamber 24. Slot 50 or the extension of side plates 42 and 44 may be made of or lined with a 17-4 pH material with a Rockwell hardness of between approximately 45-50 to enhance its wear characteristics. A blade 52 may be mounted on the bottom and leading edge of front plate 46 for contacting skeleton 34 when shearing device 40 is moved into contact with skeleton 34. Blade 52 may be a tool steel blade. In addition, a shear 54 may be mounted in shear chamber 24 and in alignment with blade 52 such that when shearing device 40 is advanced toward shear 54, blade 52 and shear 54 come into sliding engagement for shearing skeleton 34. Shear 54 may be made of stainless steel and may be removably arranged so that it may be replaced if it becomes worn during service. Shear 54 may also comprise a second blade 55 made of tool steel which may be used for the contact surface.

Figure 8:
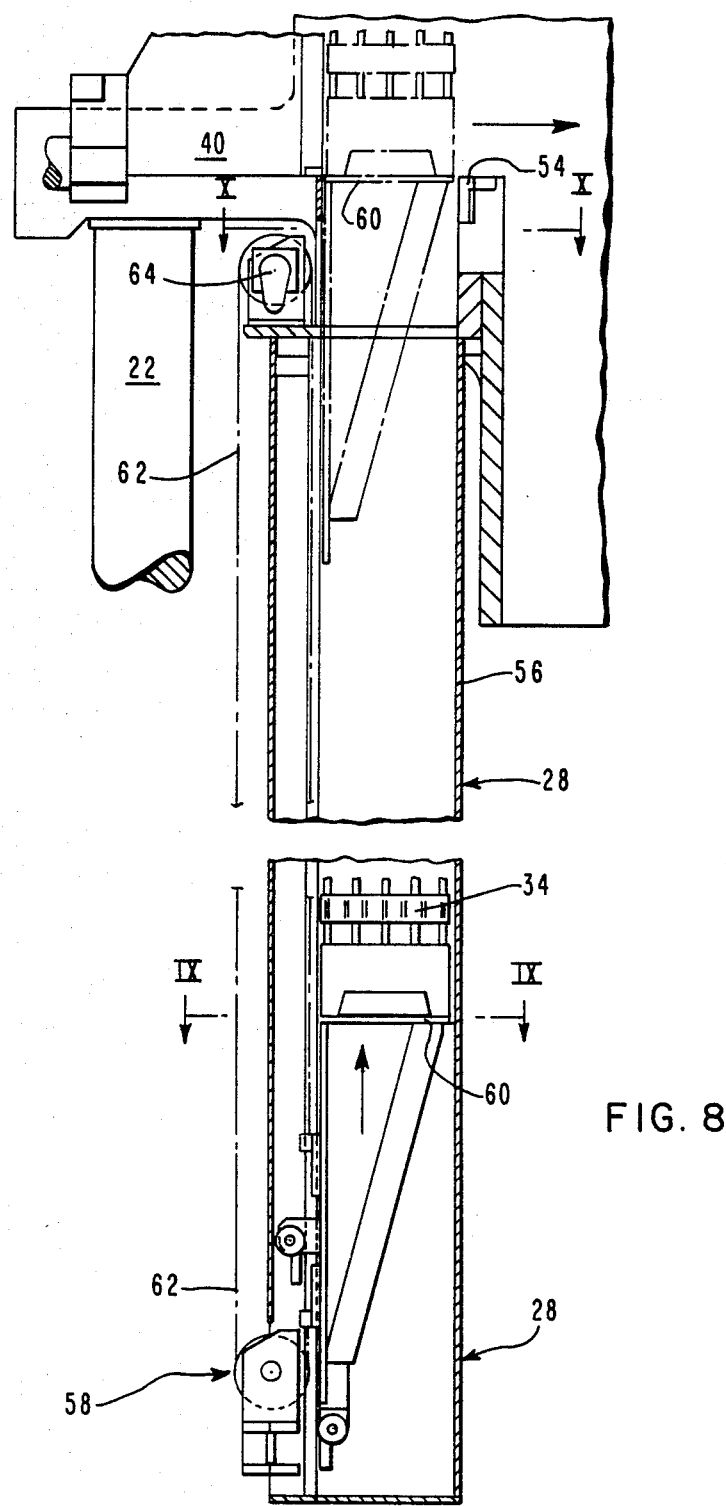
FIG. 8 is a cross-sectional view in elevation of the feed chamber.
Figure 9:
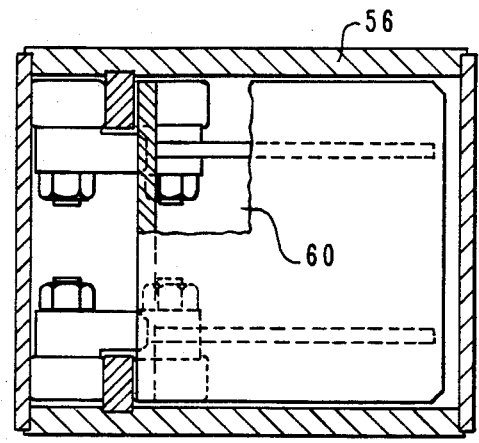
FIG. 9 is a view along line IX—IX of FIG. 8.
Figure 10:
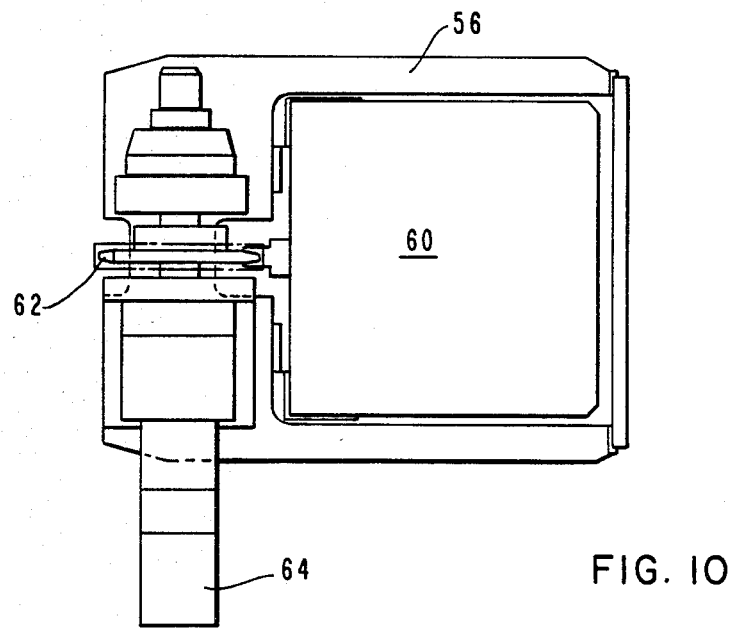
FIG. 10 is a view along line X—X of FIG. 8.

Referring to FIG. 8, feed chamber 28 is attached to the bottom of shear chamber 24 and comprises a substantially rectangular housing 56 that is attached to shear chamber 24 and has an open end at that end. Feed chamber 28 has an elevator mechanism 58 mounted therein for supporting and moving skeleton 34 into shear chamber 24. Elevator mechanism 58 comprises a platform 60 disposed in housing 56 and attached to a chain and sprocket mechanism 62. An air motor 64 which may be a 0.5 hp motor is mounted on the top portion of housing 56 and extends therethrough and is attached to chain and sprocket mechanism 62 for selectively moving platform 60 vertically in housing 56. In this manner, with skeleton 34 disposed in housing 56 and on platform 60, the activation of air motor 64 can produce movement of chain and sprocket mechanism 62 so as to be able to vertically move platform 60 and skeleton 34 in housing 56. As platform 60 is moved upwardly toward the open end of housing 56, skeleton 34 is moved out of feed chamber 28 and into shear chamber 24 so that shearing device 40 can shear skeleton 34 into a multiplicity of small pieces.

Figure 6:
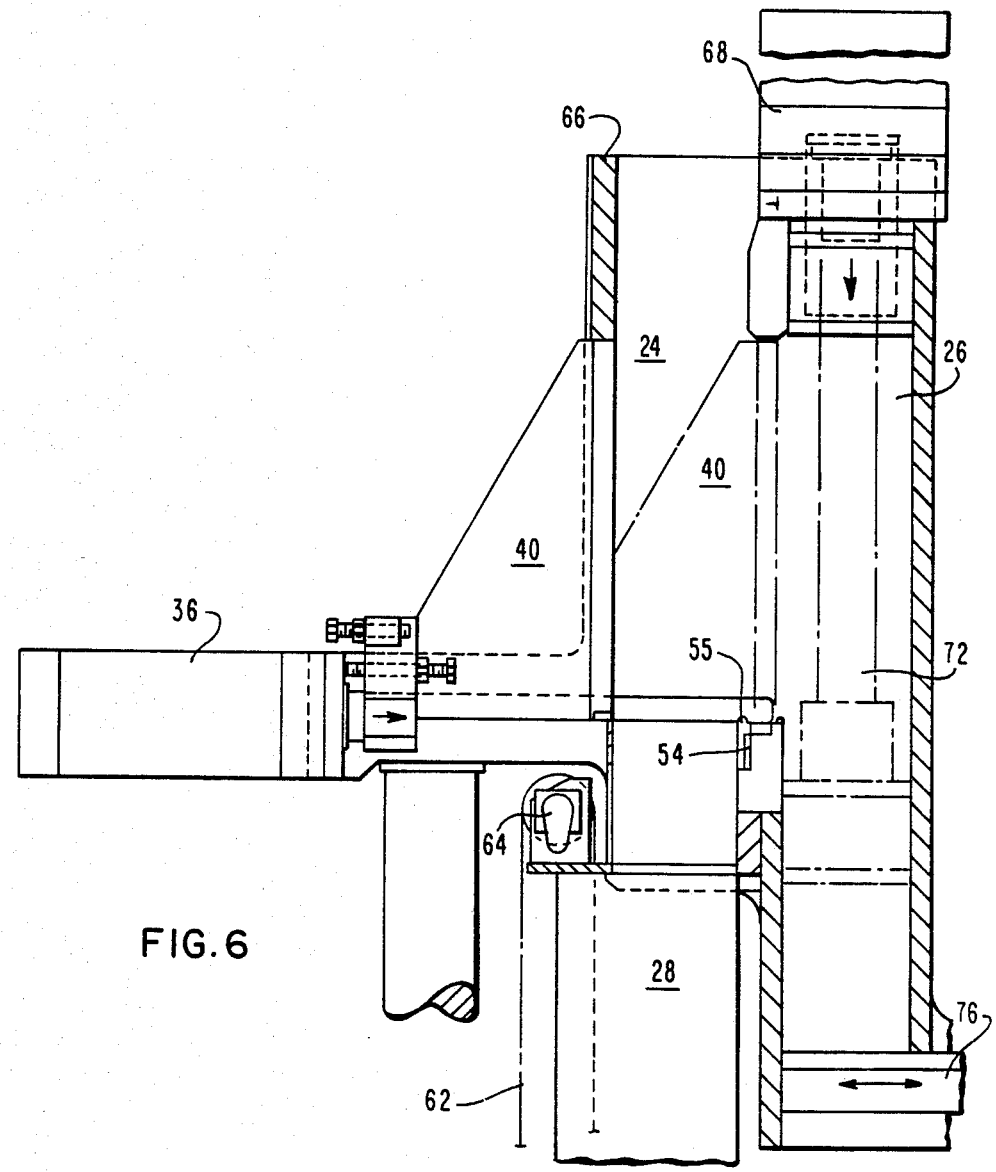
FIG. 6 is a schematic of the shear and compaction chambers.

Referring to FIG. 6, shear chamber 24 has an entrance opening 66 on top thereof that is in alignment with feed chamber 28, such that skeleton 34 may be vertically lowered through entrance opening 66, through shear chamber 24, and onto platform 60. With the activation of air motor 64, platform 60 and skeleton 34 can be lowered into feed chamber 28 so that skeleton 34 can then be raised for the shearing operation as previously described.

Figure 3:
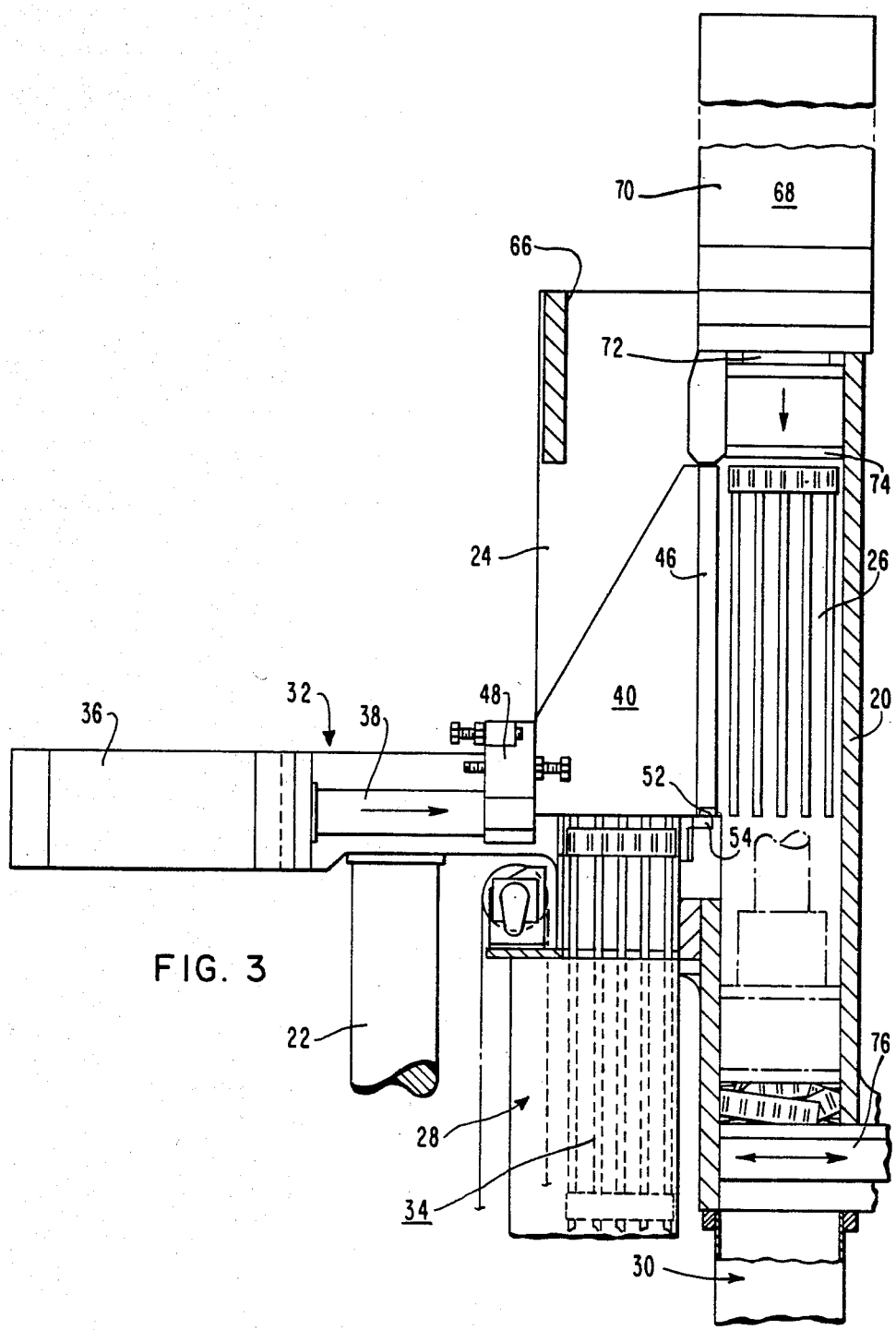
FIG. 3 is a cross-sectional view in elevation of the shear chamber and compaction chamber.
Figure 7:
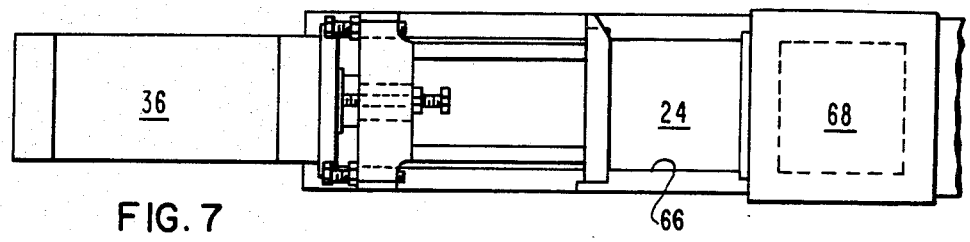
FIG. 7 is a top view of FIG. 6.

Referring again to FIGS. 3-7, a compaction device 68 is mounted on compaction chamber 26, in alignment with canister 30, and extends into compaction chamber 26 for compacting the pieces of skeleton 34 that have been sheared by shearing device 40. Compaction device 68 comprises an hydraulic second cylinder 70 and a second piston 72 which may have approximately a 10 inch bore and approximately a 55 inch stroke and is vertically disposed relative to compaction chamber 26. Second cylinder 70 is capable of exerting approximately 40 tons force. Second piston 72 may have a replaceable wear pad 74 on the leading edge thereof for contacting the pieces of skeleton 34 for compaction. As can be seen in FIG. 3, as portions of skeleton 34 are sheared by shearing device 40, the pieces of skeleton 34 are pushed into compaction chamber 26 directly under second piston 72. When in this position, second cylinder 70 may be activated which causes second piston 72 to be extended downwardly as shown in phantom in FIG. 3. As second piston 72 is extended downwardly, wear pad 74 contacts the pieces of skeleton 34 disposed in compaction chamber 26 and compacts those pieces against metal slide 76.

Referring more specifically to FIGS. 4 and 5, slide 76 is slidably connected to third piston 78 which is also connected to third cylinder 80. Third piston 78 and third cylinder 80 may have approximately a 7 inch bore and approximately a 9 inch stroke and are horizontally disposed and attached to compaction housing 20 at a vertical location lower than shearing device 40. As shown in FIGS. 3 and 4, the action of third cylinder 80 can cause slide 76 to slide horizontally into and out of compaction housing 20. When slide 76 is withdrawn from compaction housing 20, the compacted pieces of skeleton 34 can be pushed into canister 30 under the action of second piston 72.

Referring now to FIGS. 4 and 5, a canister loading mechanism 82 is disposed under and attached to a portion of compaction housing 20 and comprises a vertical pin 84 that is attached to compaction housing 20, a horizontally disposed arm 86 rotatably attached to pin 84, and a loading gate 88 attached to arm 86. Loading gate 88 may be a U-shaped member having an open side for accepting a canister 30. A fourth cylinder 90 and a corresponding fourth piston 92 which may have approximately a 2 inch bore and a 10 inch stroke are attached to compaction housing 20 and to arm 86 for pivoting arm 86 and loading gate 88 around pin 84 as shown in FIG. 5. As shown in FIG. 5, when fourth piston 92 is extended by the action of fourth cylinder 90, arm 86 and loading gate 88 are pivoted around pin 84 into alignment with slide 76 and second piston 72 so that a canister 30 disposed in gate 88 will be in a position to accept the compacted pieces of skeleton 34 when slide 76 is withdrawn. When fourth piston 92 is drawn into fourth cylinder 90, arm 86 and gate 88 are caused to be rotated in a substantially horizontal plane and away from compaction housing 20 so that a canister 30 may be removed from or loaded into loading gate 88.

OPERATION

When it is desired to compact a skeleton 34, the skeleton 34 may be remotely lowered through entrance opening 66, through shear chamber 24 and onto platform 60 of elevator mechanism 58. Air motor 64 may then be activated which causes chain and sprocket mechanism 62 to lower platform 60 with skeleton 34 thereon into the lower portion of feed chamber 28. Once skeleton 34 has thus been lowered into feed chamber 28, the compaction process may then begin.

With shearing device 40 in the withdrawn position, air motor 64 may be activated to raise platform 60 and skeleton 34 so that a portion of skeleton 34 extends into shear chamber 24. When in this position, first cylinder 36 may be activated to cause first piston 38 and shearing device 40 to be moved into shear chamber 24. As shearing device 40 is moved into shear chamber 24, front plate 46 and blade 52 contact skeleton 34 thereby shearing skeleton 34 against shear 54. As this shearing process continues and with second piston 72 in the withdrawn position, the sheared portion of skeleton 34 is pushed into compaction chamber 26 directly beneath second piston 72 as shown in FIG. 3. Next, second cylinder 70 is activated which causes second piston 72 to be moved downwardly through the compaction chamber 26 thereby compacting against slide 76 that portion of skeleton 34 disposed in compaction chamber 26, as shown in FIG. 3. This portion of the process may be repeated several times until a sufficient amount of compacted skeleton 34 is located in the lower portion of compaction chamber 26 and against slide 76. Then, third cylinder 80 may be activated thereby withdrawing third piston 78 and slide 76 which allows second piston 72 to push the compacted portions of skeleton 34 into canister 30 which is then located beneath slide 76 as shown in FIGS. 3 and 4. Again, this portion of the process continues until canister 30 is filled with compacted skeleton 34. In normal operation, canister 30 can hold 9 to 10 times the volume of uncompacted skeletons 34. However, once canister 30 is filled with compacted pieces of skeleton 34, fourth cylinder 90 can be activated thereby withdrawing fourth cylinder 92 and rotating arm 86 and loading gate 88 about pin 84 thereby rotating loading gate 88 with canister 30 therein away from compaction housing 20 so that the filled canister 30 may be removed and replaced with an empty canister 30. The empty canister may then be rotated under slide 76 and additional skeletons 34 can be similarly compacted.

Therefore, the invention provides a system for compacting a spent nuclear fuel assembly skeleton while the skeleton remains submerged in a coolant.

We claim:

1. Apparatus for compacting an irradiated nuclear fuel assembly skeleton while said skeleton remains submerged in a water coolant comprising:
   a vertically disposed compaction housing mounted on a plurality of vertical supports and defining therein a shear chamber and a compaction chamber;
   a first cylinder horizontally disposed relative to said compaction housing;
   a first piston connected to said first cylinder,
   a vertically disposed first side plate slidably connected to said compaction housing;
   a vertically disposed second side plate slidably connected to said compaction housing;
   a front plate attached to said first and second side plates;
   a blade mounted on the bottom and leading edge of said front plate;
   a shear mounted in said shear chamber and in alignment with said blade for shearing said skeleton when said skeleton is forced between said front plate and said shear;
   a mounting mechanism attached at one end to said first and second side plates and at the other end to said first piston and capable of sliding horizontally into and out of said shear chamber for causing said front plate and said shear to contact said skeleton thereby shearing said skeleton into a plurality of pieces and thereby moving said pieces into said compaction chamber;
   a feed chamber vertically disposed and attached to said compaction housing near said shear chamber for introducing said skeleton into said shear chamber;
   an elevator mechanism disposed in said feed chamber for selectively moving said skeleton in said feed chamber and into said shear chamber;
   a compaction device mounted on said compaction housing near said compaction chamber for compacting said pieces of said skeleton that are introduced into said compaction chamber by said front plate; and
   a canister vertically disposed under said compaction device for receiving the compacted pieces of said skeleton.

2. The apparatus according to claim 1 wherein said apparatus further comprises a metal slide horizontally and moveably disposed in said compaction chamber between said compaction device and said canister for providing a surface against which said pieces of said skeleton may be compacted and for providing an openable closure between said compaction chamber and said canister.

3. The apparatus according to claim 2 wherein said elevator mechanism comprises:
   a chain and sprocket mechanism disposed in said feed chamber;
   a platform disposed in said feed chamber and connected to said chain and sprocket mechanism for supporting said skeleton; and
   an air motor connected to said chain and sprocket mechanism for activating said chain and sprocket mechanism.

4. The apparatus according to claim 3 wherein said compaction device comprises:
   a second cylinder mounted on said compaction housing and in alignment with said slide;
   a second piston connected to said second cylinder; and
   a wear pad attached to said second piston for compacting said pieces of said skeleton against said slide.

5. The apparatus according to claim 4 wherein said apparatus further comprises:
   a third piston attached to said slide; and
   a third cylinder connected to said third piston for selectively moving said slide relative to said compaction chamber.

6. The apparatus according to claim 5 wherein said apparatus further comprises a canister loading mechanism disposed under and attached to a portion of said compaction housing for supporting said canister.

7. The apparatus according to claim 6 wherein said canister loading mechanism comprises:
   a vertical pin attached to the underside of said compaction housing;
   a horizontally disposed arm rotatably attached to said pin;
   a loading gate attached to said arm for holding said canister;
   a fourth piston attached to said arm for rotating said arm about said pin; and
   a fourth cylinder attached to said compaction housing and connected to said fourth piston for selectively moving said fourth piston and said arm thereby selectively locating said loading gate and said canister under said slide or away from said compaction housing.

* * * * *